US008183472B2

(12) United States Patent
Ooki et al.

(10) Patent No.: US 8,183,472 B2
(45) Date of Patent: May 22, 2012

(54) WATERPROOFING APPARATUS FOR ELECTRICAL CABLE END, AND METHOD OF WATERPROOFING ELECTRICAL CABLE END

(75) Inventors: Akihiko Ooki, Yonezawa (JP); Takeaki Sakaki, Yonezawa (JP); Daisuke Takeda, Yonezawa (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/071,685

(22) Filed: Mar. 25, 2011

(65) Prior Publication Data

US 2011/0167925 A1 Jul. 14, 2011

Related U.S. Application Data

(63) Continuation of application No. PCT/JP2008/067810, filed on Oct. 1, 2008.

(51) Int. Cl.
*H02B 1/015* (2006.01)

(52) U.S. Cl. ........................................ 174/500

(58) Field of Classification Search .................... 174/51, 174/753, 50.59; 239/70; 439/606; 29/870
See application file for complete search history.

(56) References Cited

U.S. PATENT DOCUMENTS 3,567,843 A * 3/1971 Collins et al. .................. 174/51
3,593,415 A * 7/1971 Wofford .......................... 29/870
3,643,208 A * 2/1972 Massa, Jr. ..................... 439/606
5,560,542 A * 10/1996 Reid ............................... 239/70
5,821,461 A * 10/1998 Sackett ........................ 174/75 B
2008/0185169 A1 8/2008 Daito

FOREIGN PATENT DOCUMENTS

CN 101237109 A 8/2008
JP 2004-355851 A 12/2004
JP 2006-202676 A 8/2006
JP 2006-202708 A 8/2006
JP 2007-305525 A 11/2007
JP 2008-159575 A 7/2008
JP 2008-186675 A 8/2008

OTHER PUBLICATIONS

International Search Report of PCT/JP2008/067810, date of mailing Dec. 9, 2008.
Chinese Office Action dated Dec. 16, 2011, issued in corresponding Chinese Patent Application No. 200880131106.8.

* cited by examiner

*Primary Examiner* — Jewel V Thompson
(74) *Attorney, Agent, or Firm* — Westerman, Hattori, Daniels & Adrian, LLP

(57) ABSTRACT

Provided is a waterproofing apparatus for an electrical cable end of the invention, in which, for waterproofing of an electrical cable end, the electrical cable end is placed in a high pressure atmosphere such that a liquid waterproofing agent dispensed onto the electrical cable end permeates the inside of a sheathed electrical cable, the apparatus is provided with; a first accommodating section that accommodates the electrical cable end to which a liquid waterproofing agent is applied, a sealing device that seals the first accommodating section, and a pressurizing device that feeds air into the first accommodating section.

7 Claims, 6 Drawing Sheets

WATERPROOFING APPARATUS FOR ELECTRICAL CABLE END, AND METHOD OF WATERPROOFING ELECTRICAL CABLE END

CROSS-REFERENCE TO RELATED APPLICATION

This is a Continuation Application of International Application No. PCT/JP2008/067810, filed on Oct. 1, 2008. The contents of the aforementioned applications are incorporated herein by reference.

BACKGROUND OF THE INVENTION

1. Field of the Invention

The present invention relates to a waterproofing apparatus for waterproofing an end of an electrical cable whose conductor (cores) is coated with insulating material around its outer periphery, such as an earthing electrical cable provided in the engine compartment of an automobile, and to a waterproofing method of an electrical cable end. In particular, the present invention relates to an electrical cable end waterproofing apparatus that, in an electrical cable that has a terminal having a ring shaped contact installed on its end for example, reliably prevents water from entering the terminal, and to an electrical cable end waterproofing method.

2. Description of the Related Art

In general, an earth cable is connected to an earthing point (such as an automobile body) in a state in which a connecting terminal, which is crimped on its end, is exposed. Therefore, if water is splashed on the earth cable, the water enters the inside of the electrical cable from the part of the terminal that is crimped to the electrical cable (crimped part). If the water moves along the inside of the sheathing material, and enters the inside of the internal equipment to which the earth cable is connected, there is concern about negative effects such as disrupting the normal operation of the internal equipment. Therefore, it is necessary to apply treatment (waterproof treatment) to the crimped part of the earth cable in order to prevent water from entering the inside of the electrical cable.

Heretofore, as a method of applying waterproof treatment to an electrical cable such as an earth cable or the like, a method is disclosed in which resin is molded so that the crimped part of the electrical cable is covered. In this method, not only does the molding require time and a large scale apparatus, but also the shape of the resin molded part becomes large, so that there is a problem in that it is difficult to perform wiring arrangement.

Therefore, a waterproof treatment method (for example, refer to Japanese Unexamined Patent Application, First Publication No. 2004-355851) in which, by dispensing a liquid waterproofing agent to one end of an earth cable, and suctioning the air inside the sheathing material of the earth cable from the other end to reduce the pressure, the liquid waterproofing agent applied to the electrical cable end permeates the inside of the sheathing material, and a waterproofing apparatus (for example, refer to Japanese Unexamined Patent Application, First Publication No. 2006-202676) that is used in this waterproofing method, have been proposed.

However, in the methods disclosed in Japanese Unexamined Patent Application, First Publication No. 2004-355851 and Japanese Unexamined Patent Application, First Publication No. 2006-202676, in the case where waterproofing is applied to a long electrical cable or an electrical cable with a large diameter, in order to reduce the pressure of the inside of the sheathing material sufficiently, the apparatus for suctioning the air inside of the sheathing material from the other end becomes large, and in addition, it takes a long time to permeate a liquid waterproofing agent into the inside of the sheathing material sufficiently. As a result, there is a problem in that the treatment cost is high.

The present invention has been made in view of the above circumstances, and has an object of providing a waterproofing apparatus for an electrical cable end that can efficiently perform waterproofing of the end of an electrical cable, such as one for earthing or the like, regardless of the length or the diameter (wire diameter) of the electrical cable, and waterproofing method for an electrical cable end in which it is used.

SUMMARY

In order to resolve the above-described problems and to achieve the related objects, the present invention adopts the following measures.

(1) A waterproofing apparatus for an electrical cable end according to the present invention is a waterproofing apparatus for an electrical cable end in which, for waterproofing of an electrical cable end, the electrical cable end is placed in a high pressure atmosphere such that a liquid waterproofing agent dispensed onto the electrical cable end permeates the inside of a sheathed electrical cable, wherein there are provided; a first accommodating section that accommodates the electrical cable end to which a liquid waterproofing agent is applied, a sealing device that seals the first accommodating section, and a pressurizing device that feeds air into the first accommodating section.

(2) Preferably a waterproofing agent dispensing device is provided that dispenses a liquid waterproofing agent onto an electrical cable end.

(3) Preferably a flow rate detecting device is further provided that detects a flow rate of air at an other end of the electrical cable.

(4) A waterproofing method of an electrical cable end according to the present invention is for a waterproofing method of an electrical cable end, which is for waterproofing of an electrical cable which is provided with a conductor, a sheathing material provided around the conductor, and a terminal crimped on one end of the conductor, wherein the method includes: a waterproofing agent dispensing step for dispensing a liquid waterproofing agent onto a crimped part of the terminal which is crimped on the conductor; and a pressurizing step for permeating the liquid waterproofing agent inside of the sheathing material by feeding pressurized air to the inside of the sheathing material from the abovementioned end.

(5) Preferably the pressurizing step is performed with the terminal, and the crimped part and its vicinity, arranged in an enclosed space.

(6) Preferably a flow rate detecting step that detects a flow rate of air, is further provided for an other end of the electrical cable.

According to the waterproofing apparatus for an electrical cable end described in (1), it is possible to waterproof the electrical cable end efficiently without using a large scale apparatus, regardless of the length or the diameter (wire diameter) of the electrical cable.

According to the method of waterproofing electrical cable end described in (4), it is possible to waterproof the electrical cable end efficiently without using a large scale apparatus, regardless of the length or the diameter (wire diameter) of the electrical cable.

EMBODIMENTS FOR CARRYING OUT THE INVENTION

The best mode for a waterproofing apparatus for an electrical cable end and a method of waterproofing electrical cable end of the present invention will be described.

This mode is described specifically in order to make the gist of the invention better understood, and it does not limit the present invention unless specified explicitly.

Figure 1A:
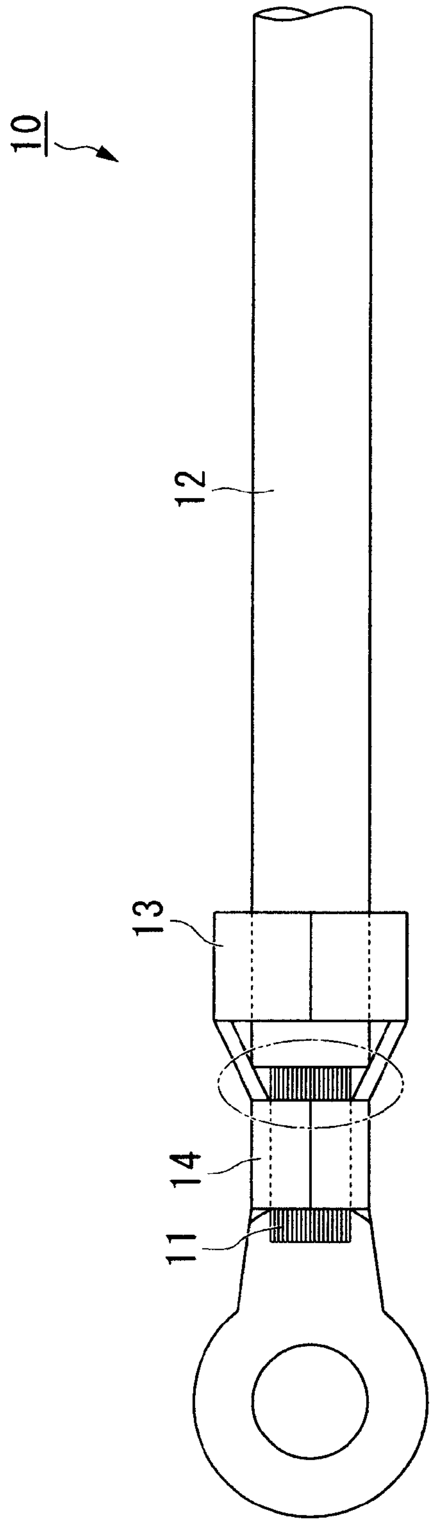
FIG. 1A is a schematic plan view showing an electrical cable end of an electrical cable that has a terminal crimped on one of its ends, illustrating an example of an electrical cable termination to which waterproofing is applied.
Figure 1B:
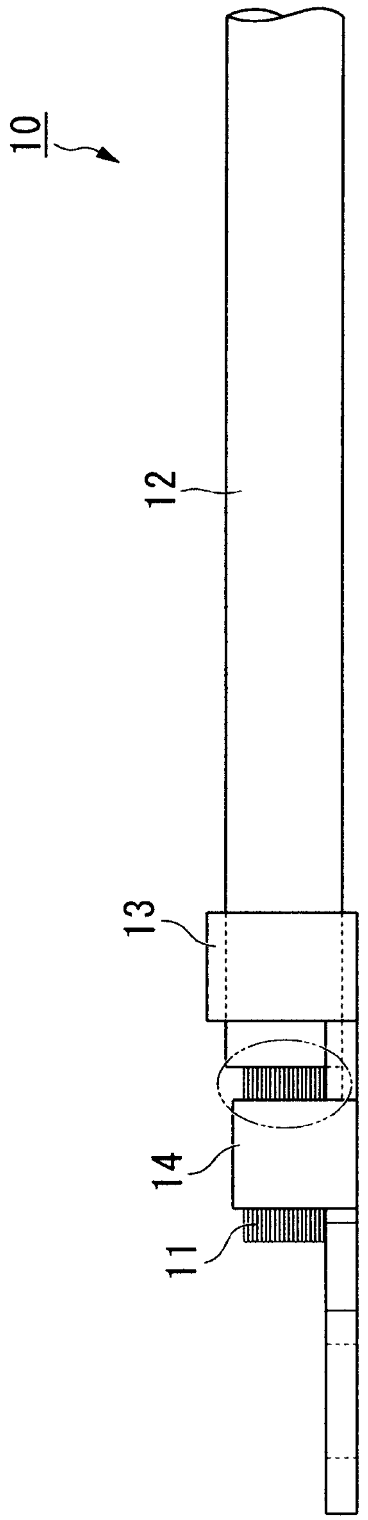
FIG. 1B is a schematic elevation view showing an electrical cable end of an electrical cable that has a terminal crimped on one of its ends, illustrating an example of an electrical cable termination to which waterproofing is applied.
Figure 2A:
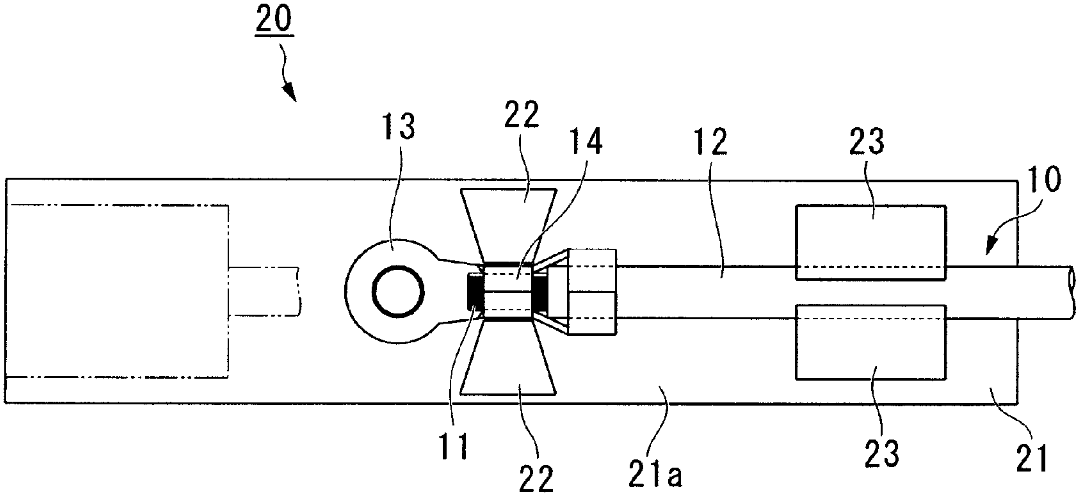
FIG. 2A is a schematic plan view showing an embodiment of a waterproofing agent dispensing device for dispensing a liquid waterproofing agent onto an electrical cable end.
Figure 2B:
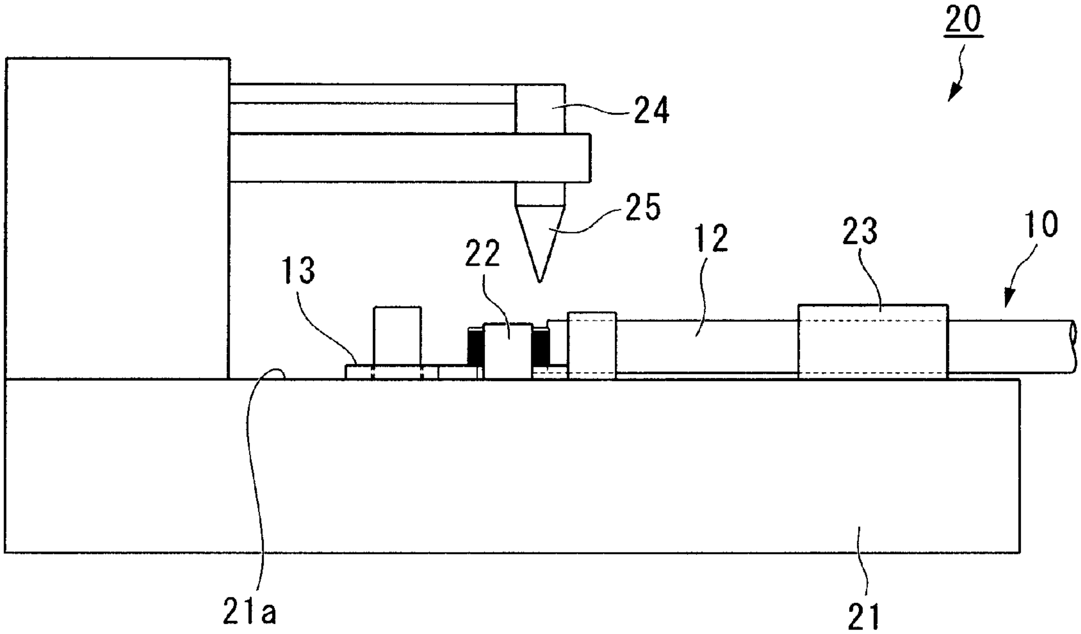
FIG. 2B is a schematic elevation view showing an embodiment of a waterproofing agent dispensing device for dispensing a liquid waterproofing agent onto an electrical cable end.
Figure 3:
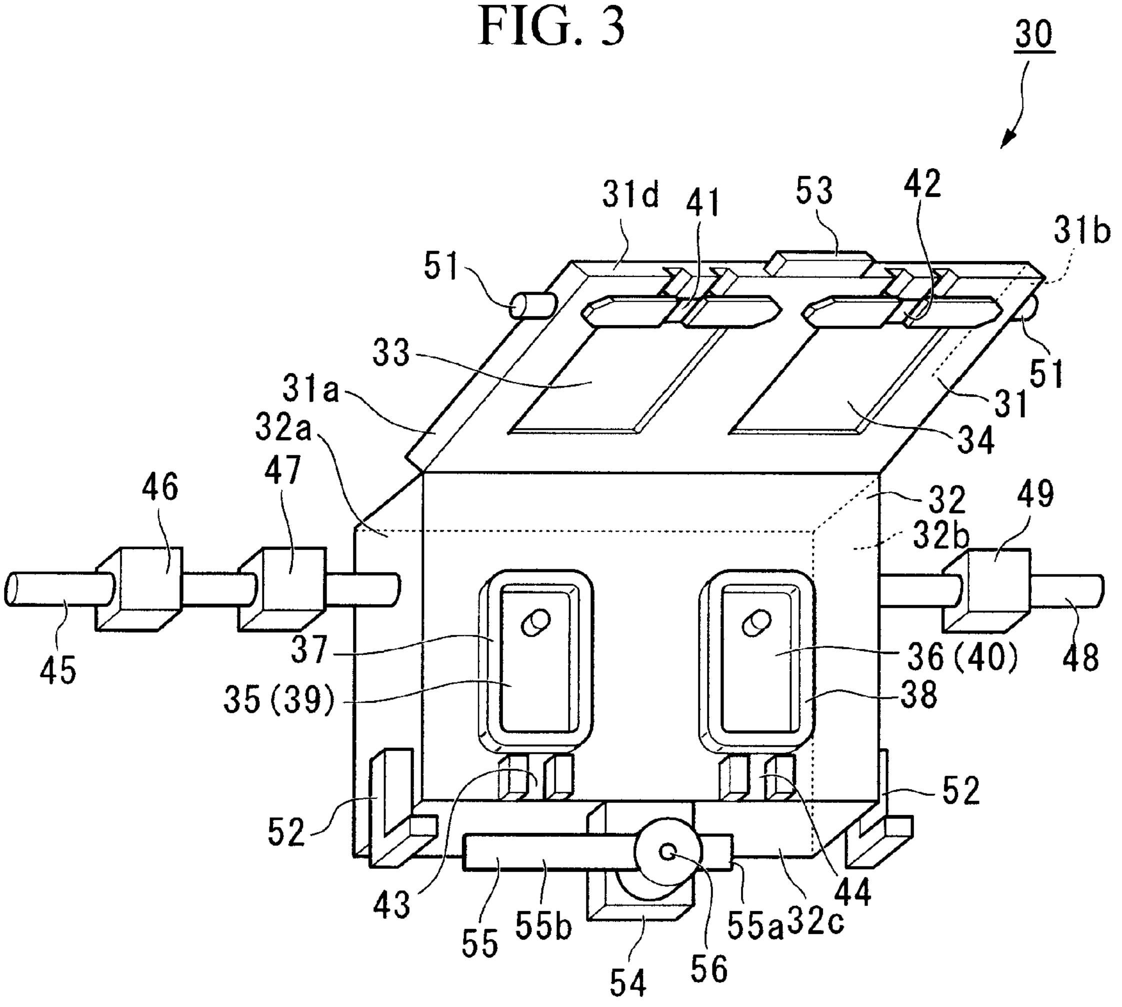
FIG. 3 is a schematic perspective view showing an embodiment of the main parts of the waterproofing apparatus for an electrical cable end of the present invention.
Figure 4:
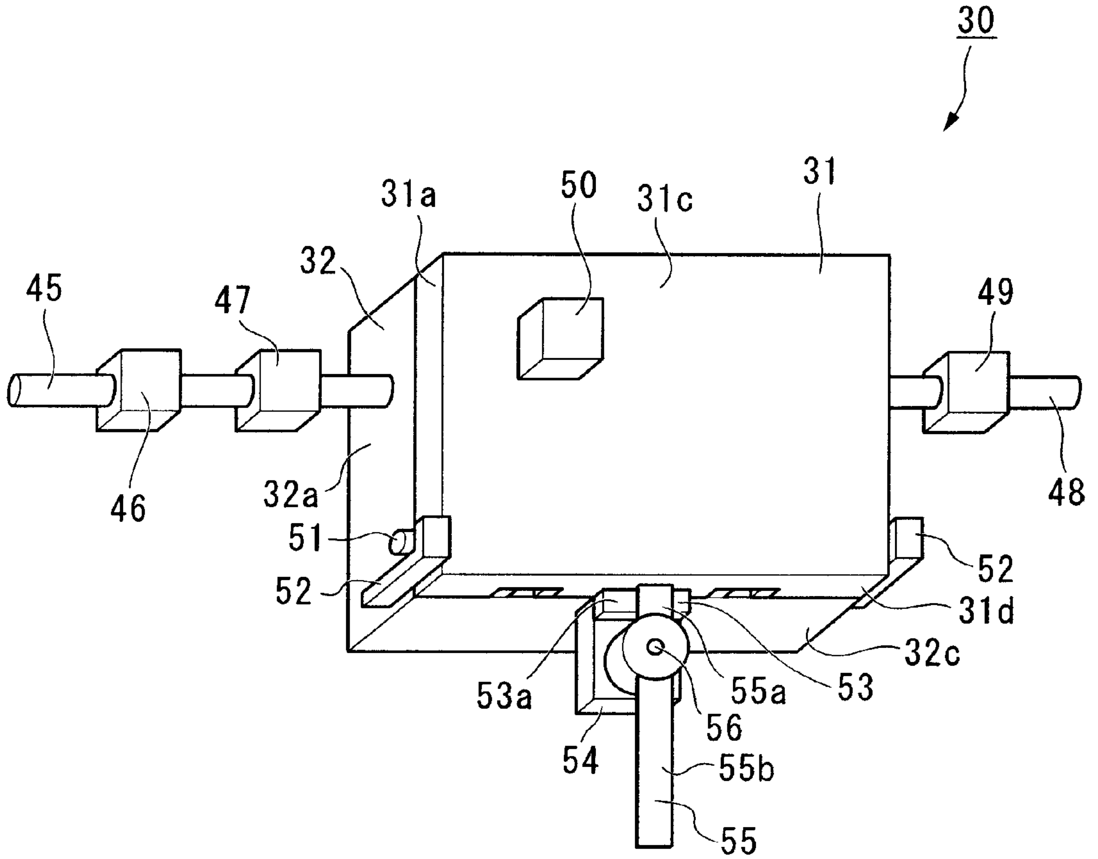
FIG. 4 is a schematic perspective view showing an embodiment of the main parts of the waterproofing apparatus for an electrical cable end of the present invention.

FIG. 1A is a schematic plan view showing an electrical cable end of an electrical cable that has a terminal crimped on one of its ends, illustrating an example of an electrical cable end to which waterproofing is applied. FIG. 1B is a schematic elevation view showing an electrical cable end of an electrical cable that has a terminal crimped on one of its ends, illustrating an example of an electrical cable end to which waterproofing is applied. FIG. 2A is a schematic plan view showing an embodiment of a waterproofing agent dispensing device for dispensing a liquid waterproofing agent onto an electrical cable end. FIG. 2B is a schematic elevation view showing an embodiment of a waterproofing agent dispensing device for dispensing a liquid waterproofing agent onto an electrical cable end. FIG. 3 is a schematic perspective view showing an embodiment of the waterproofing apparatus for an electrical cable end of the present invention. FIG. 4 is a schematic perspective view showing an embodiment of the waterproofing apparatus for an electrical cable end of the present invention.

An electrical cable 10 shown in FIG. 1A and FIG. 1B is a sheathed electrical cable provided with, schematically, a conductor 11, a sheathing material 12 provided around the conductor 11, and a terminal 13 crimped on one end of the conductor 11. The conductor 11 is made up of a plurality of twisted conductive wires. The conductive wires are in close contact with each other but there are small gaps between the conductive wires. Therefore, if water splashes on the electrical cable 10, there is concern that the water will move along the gaps, and enter the inside of the electrical cable. In this electrical cable 10, the sheathing material 12 at one end is removed, the end of the conductor 11 is exposed, and the terminal 13 is crimped on the exposed part of the conductor 11. Here, the part of the terminal 13 on which the conductor 11 is crimped is designated a crimped part 14.

Waterproofing Apparatus for an Electrical Cable End

The waterproofing apparatus for an electrical cable end of this embodiment is a waterproofing apparatus in which, for the waterproofing of the cable end of a sheathed electrical cable that has a terminal crimped on one of its ends, the one end side of the electrical cable is placed in a high pressure atmosphere such that a liquid waterproofing agent dispensed onto the electrical cable end permeates the inside of the sheathed electrical cable. The waterproofing apparatus for am electrical cable end is schematically provided with a first accommodating section 39 that accommodates the electrical cable end to which a liquid waterproofing agent is applied, a mold 30 which has a sealing device that seals the first accommodating section 39, and a pressurizing device that feeds air into the first accommodating section 39.

As shown in FIG. 2A and FIG. 2B, a waterproofing agent dispensing device 20 for dispensing a liquid waterproofing agent onto the electrical cable end is provided with, schematically, a base 21, fastening devices 22 and 23 which are provided on a surface 21*a* of the base 21 for fastening the end of the electrical cable 10 on which a terminal 13 is crimped onto the surface 21*a*, and an injecting device 24 for injecting (dripping) a fixed quantity of a liquid waterproofing agent.

As the fastening device 22, a clamp for fastening the crimped part 14 of the terminal 13 of the electrical cable 10, or the like, is used. Furthermore, as the fastening device 23, a clamp for fastening the sheathing material 12 of the electrical cable 10, or the like, is used.

As the injecting device 24, an injector having a nozzle 25 at its tip is used for injecting a fixed amount of a liquid waterproofing agent having fluidity onto the vicinity of the boundary between the conductor 11 and the sheathing material 12 in the crimped part 14.

Moreover using the waterproofing agent dispensing device 20, a liquid waterproofing agent is dispensed onto the vicinity (broken line part of FIG. 1A and FIG. 1B) of the boundary between the conductor 11 and the sheathing material 12 in the crimped part 14 of the terminal 13 of the electrical cable 10.

As shown in FIG. 3 and FIG. 4, the mold 30 is provided with an upper mold 31 and a lower mold 32, which are connected such that they can be opened and closed by an opening and closing mechanism such as a hinge.

The upper mold 31 is provided with a first concave section 33 that accommodates the terminal 13, and the crimped part 14 and its vicinity, of the electrical cable 10, and a second concave section 34 that accommodates the end of the electrical cable 10 where the terminal 13 is not crimped.

The lower mold 32 is provided with a third concave section 35 that accommodates the terminal 13, and the crimped part 14 and its vicinity, of the electrical cable 10, and a fourth concave section 36 that accommodates the end of the electrical cable 10 where the terminal 13 is not crimped.

Furthermore, the surroundings of the third concave section 35 and the fourth concave section 36 are enclosed by a sealing material 38 such as a packing.

In this mold 30, by mating the upper mold 31 and the lower mold 32 together, the first concave section 33 and the third concave section 35 are mated together via a sealing material 37, forming a sealed first accommodating section 39. Moreover, similarly, the second concave section 34 and the fourth concave section 36 are mated together, forming a sealed second accommodating section 40.

The first concave section 33 of the upper mold 31 is provided with a guide slot 41 in which the sheathed part (part where the sheathing material 12 is provided) of the electrical cable 10 is inserted with no gap, and that guides the parts excluding the terminal 13, and the crimped part 14 and its vicinity, of the electrical cable 10, to the outside of the first concave section 33 in a straight line. Similarly, the second concave section 34 of the upper mold 31 is provided with a guide slot 42 in which the sheathed part of the electrical cable 10 is inserted with no gap, and that guides the parts excluding the other end of the electrical cable 10 to the outside of the second concave section 34 in a straight line. That is, there are provided the guide slot 41 that accommodates one end of the electrical cable in the first accommodating section 39 in a sealed state, and the guide slot 42 that accommodates the other end of the electrical cable in the second accommodating section 40 in a closed state. The sizes of the guide slots 41 and 42 are adjusted appropriately according to the outer diameter of the sheathed part, in order to fasten the sheathed part of the electrical cable 10 with no gap.

Similarly, the third concave section 35 of the lower mold 32 is provided with a guide slot 43 in which the sheathed part of the electrical cable 10 is inserted with no gap, and that guides the parts excluding the terminal 13, and the crimped part 14 and its vicinity, of the electrical cable 10, to the outside of the third concave section 35 in a straight line. Similarly, the fourth concave section 36 of the lower mold 32 is provided with a guide slot 44 in which the sheathed part of the electrical cable 10 is inserted with no gap, and that guides the parts excluding the other end of the electrical cable 10 to the outside of the fourth concave section 36 in a straight line. The sizes of the guide slots 43 and 44 are adjusted appropriately according to the outer diameter of the sheathed part, in order to fasten the sheathed part of the electrical cable 10 with no gap.

Furthermore, the side face **32*a* of the lower mold 32 is provided with an air inlet pipe 45, which is fitted inside the lower mold 32, and connected to a passage (omitted in the figure) leading through to the first accommodating section 39**.

Moreover, a pressurizing device (omitted in the figure) is connected to the end on the opposite side to the side where the air inlet pipe 45 is connected to the lower mold 32. The pressuring device feeds air into the first accommodating section 39, and creates a high pressure atmosphere in the first accommodating section 39. By so doing, a liquid waterproofing agent is permeated inside of the sheathing material 12, that is, between the conductor 11 and the sheathing material 12, and between the plurality of conducting wires constituting the conductor 11, from one end of the electrical cable 10, which is accommodated in the first accommodating section 39 and on which the terminal 13 is crimped, toward the other end. For the pressurizing device, a compressed air generator such as an air compressor may be used, for example.

Furthermore, a pressure control device 46 for controlling the pressure of the air fed into the first accommodating section 39, and a flow rate detecting device 47 that detects the flow rate of the air fed into the first accommodating section 39 and the flow rate of air leaking from the first accommodating section 39, are provided partway along the air inlet pipe 45, in that order, from the pressuring device side.

As the pressure control device 46, a solenoid valve such as an electro-pneumatic regulator that can adjust air pressure within a range of 0 MPa to 0.5 MPa as desired over time, may be used, for example.

As the flow rate detecting device 47, a typical air flow meter is used.

Moreover, the side face **32*b* of the lower mold 32 is provided with an air inlet pipe 48, which is fitted inside the lower mold 32, and connected to a passage (omitted in the figure) leading through to the second accommodating section 40**.

Furthermore, a flow rate detecting device 49 that detects the flow rate of air leaking from the end of the electrical cable 10 on the opposite side to the side where the terminal 13 is crimped, is provided partway along the air outlet pipe 48.

As the flow rate detecting device 49, a typical air flow meter is used.

Moreover, a pressure detecting device 50, which includes a detecting section provided inside the upper mold 31 and inserted in a hole (omitted in the figure) leading through to the first accommodating section 39, is provided on the top face **31*c* of the upper mold 31 for detecting the pressure in the first accommodating section 39**.

As the pressure detecting device 50, a typical pressure gage having a pressure sensor as a detecting section is used.

The side faces **31*a* and 31*b* of the upper mold 31 are each provided with protrusions 51, which protrude in directions perpendicular to the side faces 31*a* and 31*b***.

On the other hand, the side faces **32*a* and 32*b* of the lower mold 32 are each provided with fastening sections 52, which are fixed on their axes such that they can be rotated in the direction of the protrusions 51 of the upper mold 31, in a state in which the upper mold 31 and the lower mold 32** are mated together.

That is, by mating the upper mold 31 and the lower mold 32 together and fastening the fastening sections 52 to the protrusions 51, it is possible to fasten the upper mold 31 to the lower mold 32.

Moreover, a front face **31*d* of the upper mold 31 is provided with a protrusion 53 which protrudes in a direction perpendicular to the front face 31*d*. On the other hand, the front face 32*c* of the lower mold 32 is provided with a protrusion 54 which protrudes in a direction perpendicular to the front face 32*c*. Furthermore, the protrusion 54 is provided with a fastening member 55, which is fixed on an axis by a rotating shaft 56, and can rotate in a direction parallel to the top face 53*a* of the protrusion 53 of the upper mold 31 in a state in which the upper mold 31 and the lower mold 32 are mated together. The fastening member 55 is provided with a short part and a long part with the rotating shaft 56 being their boundary. The short part is the latching section 55*a* to be latched to the protrusion 53, and the long part is a gripping part 55*b* to be gripped when rotating the fastening member 55**.

In this embodiment, a sealing device that seals the first accommodating section 39 and the second accommodating section 40 is provided with the protrusion 53, the protrusion 54, the fastening section 55, and the rotating shaft 56.

That is, by mating the upper mold 31 and the lower mold 32 together, and rotating the fastening member 55, the fastening section **55*a* is fastened to the protrusion 53. By so doing, the degree of adhesion of the lower mold 32 and the upper mold 31 increases, so that it is possible to seal the first accommodating section 39 and the second accommodating section 40**.

(Waterproofing Method for an Electrical Cable End)

Next is a description of a waterproofing method for an electrical cable end using the above-described waterproofing apparatus for an electrical cable end, with reference to FIG. 2A, FIG. 2B, FIG. 5 and FIG. 6.

Firstly, the electrical cable 10 is placed on the base 21 of the waterproofing agent dispensing device 20, and the electrical cable end where the terminal 13 is crimped is fastened by the fastening devices 22 and 23.

Then, a predetermined amount of liquid waterproofing agent is injected (dripped) onto the vicinity of the boundary between the conductor 11 and the sheathing material 12 in the crimped part 14 of the terminal 13 of the electrical cable 10 fastened on the base 21 (waterproofing agent dispensing process).

The amount of the liquid waterproofing agent injected (dripped) is adjusted appropriately according to the length and diameter (wire diameter) of the conductor 11 of the electrical cable 10.

As a liquid waterproofing agent, a solid resin as used for the waterproofing of electrical cable ends such as earth cables or the like is typically used. However, among such resins, it is preferable to use a silicone resin from the points of view of water resistance, heat resistance, cold resistance, and the like. Furthermore, among silicone resins, in order to make it easy to permeate inside of the sheathing material 12 of the electrical cable 10, that is, between the conductor 11 and the sheathing material 12, and between the plurality of conducting wires constituting the conductor 11 at a normal temperature (23° C.), it is preferable to use one whose viscosity at a normal temperature (23° C.) is in the range of 600 Pa·ms to 1000 Pa·ms. Moreover, if the resins are heated, the resins whose viscosity is in the range of 100 Pa·ms to 5000 Pa·ms at a normal temperature may be used.

Figure 5:
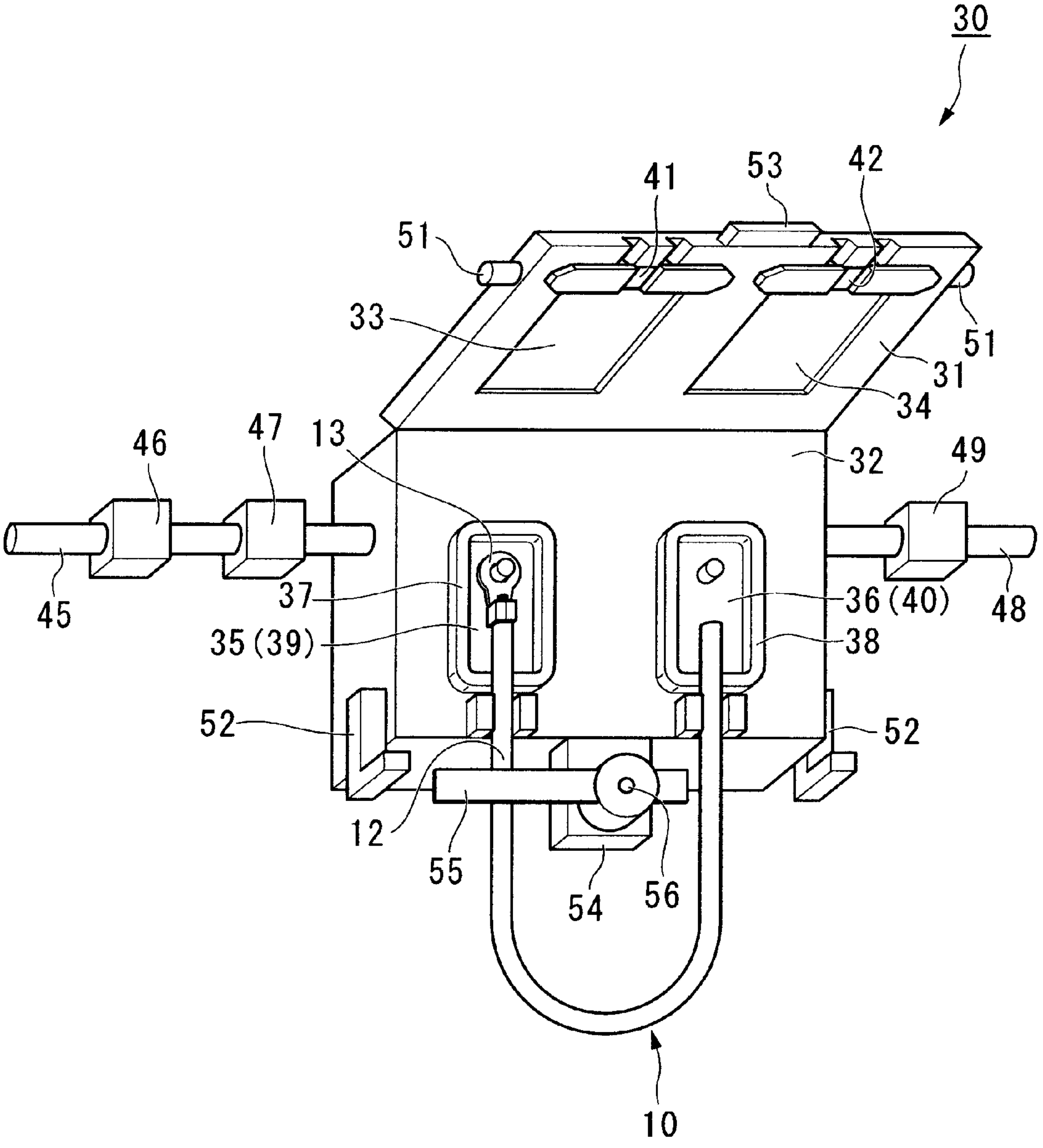
FIG. 5 is a schematic perspective view illustrating an embodiment of a waterproofing method of electrical cable end of the present invention.

Next, as shown in FIG. 5, the terminal 13, and the crimped part 14 and its vicinity, of the electrical cable 10, onto which the liquid waterproofing agent has been injected, are accommodated and fastened in the first accommodating section 39 of the lower mold 32 of the mold 30, and also the sheathed part of the electrical cable 10 is inserted in the guide slot 43.

Furthermore, the end of the electrical cable 10 on which the terminal 13 is not crimped is accommodated in the second accommodating section 40 of the lower mold 32 of the mold 30, and also the sheathed part of the electrical cable 10 is inserted in the guide slot 44.

Figure 6:
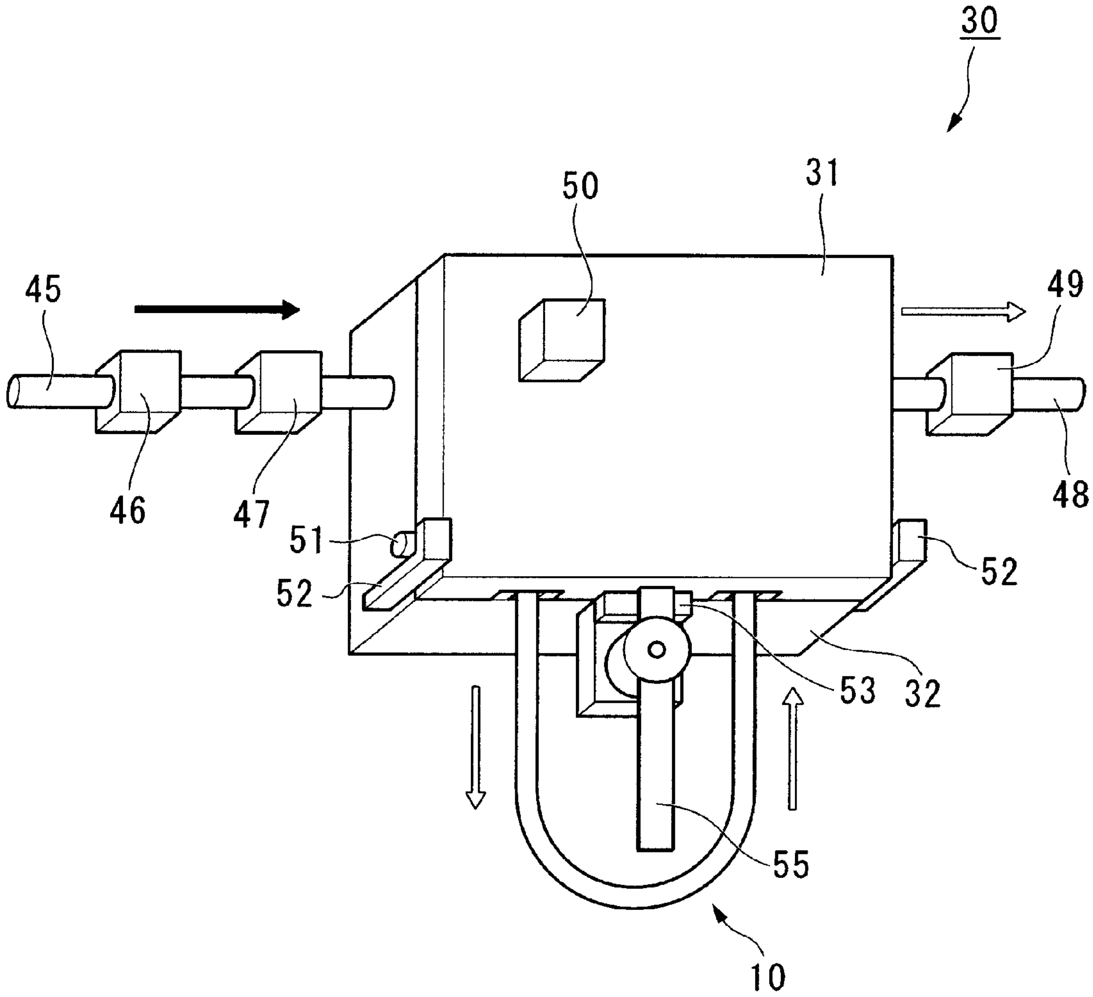
FIG. 6 is a schematic perspective view illustrating an embodiment of a waterproofing method of electrical cable end of the present invention.

Next, as shown in FIG. 6, the upper mold 31 and the lower mold 32 are mated together such that the sheathed parts of the electrical cable 10 are inserted in both the guide slots 41 and 42 of the upper mold 31.

Next, the upper mold 31 is secured to the lower mold 32 by fastening the fastening sections 52 to the protrusions 51 of the upper mold 31.

Next, by rotating the fastening member 55 to fasten the fastening section 55*a* to the protrusion 53, the upper mold 31 and the lower mold 32 are clamped together, and in a state in which the terminal 13, and the crimped part 14 and its vicinity, of the electrical cable 10 are accommodated, and in a state in which the end of the electrical cable 10 on which the terminal 13 is not crimped is accommodated, the second accommodating section 40 is sealed.

Next, air is fed into the first accommodating section 39 from the pressurizing device via the air inlet pipe 45 (direction of arrow in FIG. 6), pressurizing the inside of the first accommodating section 39 to create a high pressure atmosphere. By placing the end of the electrical cable 10 on which the terminal 13 is crimped in a high pressure atmosphere, the liquid waterproofing agent injected onto the vicinity of the boundary between the conductor 11 and the sheathing material 12 is permeated inside of the sheathing material 12, that is, between the conductor 11 and the sheathing material 12, and between the plurality of conducting wires constituting the conductor 11 (pressurizing process).

In the pressurizing process, the pressure of the air fed into the first accommodating section 39 from the pressurizing device is maintained in a range of 0 MPa to 0.5 MPa by the pressure control device 46, and also the flow rate of the air fed into the first accommodating section 39 and the flow rate of the air leaking from the first accommodating section 39 are detected by the flow rate detecting device 47.

As a result, the pressure of the air fed into the first accommodating section 39 is adjusted appropriately according to the length or the diameter (wire diameter) of the conductor 11 of the electrical cable 10.

Moreover, in the pressurizing process, the pressure inside of the first accommodating section 39 is detected by the pressure detecting device 50.

As a result, in a state in which the upper mold 31 and the lower mold 32 are mated together, it is possible to confirm whether or not the liquid waterproofing agent has permeated the inside of the sheathing material 12 of the electrical cable 10 in the first accommodating section 39, without visual observation of the inside of the first accommodating section 39.

Furthermore, in the pressurizing process, the flow rate detecting device 49 detects whether air leaks from the end of the electrical cable 10 on the opposite side to the side where the terminal 13 is crimped (flow rate detecting process).

In the flow rate detecting process, in the case where it is detected that air is leaking from the end of the electrical cable 10 on the opposite side to the side where the terminal 13 is crimped, it can be determined that the liquid waterproofing agent has not been permeated normally into the inside of the sheathing material 12 of the electrical cable 10, that is, between the conductor 11 and the sheathing material 12, and between the plurality of conducting wires constituting the conductor 11. On the other hand, in the case where air leakage is not detected, it can be determined that the liquid waterproofing agent has been permeated normally into the inside of the sheathing material 12 of the electrical cable 10, that is, between the conductor 11 and the sheathing material 12, and between the plurality of conducting wires constituting the conductor 11.

In the case where the amount of air fed into the first accommodating section 39 from the pressurizing device is controlled by the pressure control device 46 such that the pressure inside of the first accommodating section 39 is constant, it is possible to determine whether or not the liquid waterproofing agent has been permeated normally to the inside of the sheathing material 12 of the electrical cable 10, that is, between the conductor 11 and the sheathing material 12, and between the plurality of conducting wires constituting the conductor 11, by detecting the flow rate of the air fed into the first accommodating section 39 by the flow rate detecting device 47.

According to the waterproofing method for an electrical cable end using the electrical cable end waterproofing apparatus of this embodiment, it is possible to permeate a liquid waterproofing agent into the inside of the sheathing material 12 of the electrical cable 10, that is, between the conductor 11 and the sheathing material 12, and between the plurality of conducting wires constituting the conductor 11, by placing the end of the electrical cable 10 on which the terminal 13 is crimped, in a high pressure atmosphere. Therefore, it is possible to perform an electrical cable end waterproofing efficiently and reliably without using a large scale apparatus, regardless of the length or the diameter (wire diameter) of the electrical cable

What is claimed is:

1. A waterproofing apparatus for an electrical cable end in which, for waterproofing of an electrical cable end, the electrical cable end is placed in a high pressure atmosphere such that a liquid waterproofing agent dispensed onto the electrical cable end permeates the inside of a sheathed electrical cable, the apparatus comprising a first accommodating section that accommodates the electrical cable end to which a liquid waterproofing agent is applied, a sealing device that seals the first accommodating section, and a pressurizing device that feeds air into the first accommodating section.

2. The waterproofing apparatus for an electrical cable end according to claim 1, further comprising a waterproofing agent dispensing device is provided that dispenses a liquid waterproofing agent onto the electrical cable end.

3. The waterproofing apparatus for an electrical cable end according to claim 1, further comprising a flow rate detecting device that detects a flow rate of air at an other end of the electrical cable.

4. A waterproofing method for an electrical cable end, for water stop treatment of an electrical cable including a conductor, a sheathing material provided around the conductor, and a terminal crimped on one end of the conductor, the method comprising:

a waterproofing agent dispensing step for dispensing a liquid waterproofing agent onto a crimped part of the terminal which is crimped on the conductor; and a pressurizing step for permeating the liquid waterproofing agent inside of the sheathing material by feeding pressurized air to the inside of the sheathing material from the one end.

5. The waterproofing method for an electrical cable end according to claim 4, wherein the pressurizing step is performed with the terminal, and the crimped part and its vicinity, arranged in an enclosed space.

6. The waterproofing method for an electrical cable end according to claim 4, further comprising a flow rate detecting step that detects a flow rate of air at an other end of the electrical cable.

7. The waterproofing apparatus for an electrical cable end according to claim 2, further comprising a flow rate detecting device that detects a flow rate of air at an other end of the electrical cable.

* * * * *